United States Patent
Munnannur et al.

(10) Patent No.: US 9,057,312 B2
(45) Date of Patent: Jun. 16, 2015

(54) SYSTEM AND APPARATUS FOR REDUCING REDUCTANT DEPOSIT FORMATION IN EXHAUST AFTERTREATMENT SYSTEMS

(71) Applicant: Cummins Emission Solutions, Inc., Columbus, IN (US)

(72) Inventors: Achuth Munnannur, Madison, WI (US); Mihai Chiruta, Madison, WI (US); Matt Young, Indianapolis, IN (US); Deepesh Goyal, Columbus, IN (US); Karthik Muruganantham, Stoughton, WI (US); Atul Abhyankar, Columbus, IN (US); Yogesh Birari, Pune (IN)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 14/050,614

(22) Filed: Oct. 10, 2013

(65) Prior Publication Data

US 2015/0101318 A1    Apr. 16, 2015

(51) Int. Cl.
  F01N 1/00    (2006.01)
  F01N 3/00    (2006.01)
  F01N 3/10    (2006.01)
  F01N 3/28    (2006.01)
  F01N 3/20    (2006.01)

(52) U.S. Cl.
  CPC ........... *F01N 3/2892* (2013.01); *F01N 2610/02* (2013.01); *F01N 2610/1453* (2013.01); *F01N 3/2066* (2013.01); *F01N 2240/20* (2013.01)

(58) Field of Classification Search
  CPC . F01N 3/2066; F01N 3/2892; F01N 2240/20; F01N 2610/02; F01N 2610/1453
  USPC .................................. 60/295, 301, 303, 324
  See application file for complete search history.

(56) References Cited

U.S. PATENT DOCUMENTS

| | | | |
|---|---|---|---|
| 4,054,418 A | 10/1977 | Miller et al. | |
| 6,722,123 B2 | 4/2004 | Liu et al. | |
| 6,745,562 B2* | 6/2004 | Berriman et al. | 60/324 |
| 8,240,137 B2 | 8/2012 | Liu et al. | |
| 2007/0101703 A1 | 5/2007 | Kanaya et al. | |
| 2007/0144158 A1* | 6/2007 | Girard et al. | 60/324 |
| 2008/0216470 A1 | 9/2008 | Sedlacek et al. | |
| 2008/0250776 A1* | 10/2008 | Brown et al. | 60/299 |
| 2010/0005791 A1* | 1/2010 | Ranganathan et al. | 60/310 |
| 2011/0107743 A1* | 5/2011 | Ranganathan et al. | 60/295 |
| 2011/0167810 A1* | 7/2011 | Lebas et al. | 60/324 |

(Continued)

FOREIGN PATENT DOCUMENTS

WO    WO-2012/047159    4/2012

OTHER PUBLICATIONS

European Patent Office Extended Search Report issued for European Patent Application No. 14187835.5 dated Dec. 22, 2014.

*Primary Examiner* — Audrey K Bradley
(74) *Attorney, Agent, or Firm* — Foley & Lardner LLP

(57) ABSTRACT

System and apparatus are disclosed for reducing reductant deposit formation in an exhaust aftertreatment system. A directing device is provided in the exhaust flow path upstream of a reductant opening into the exhaust flow path. The directing device is configured to direct an exhaust flow toward the reductant opening and around the directing device to effectively mix the exhaust flow with a reductant provided through the reductant opening to reduce the formation of reductant deposits.

16 Claims, 3 Drawing Sheets

(56) References Cited

U.S. PATENT DOCUMENTS

2011/0258989 A1 10/2011 Hirota et al.
2012/0020854 A1* 1/2012 Makartchouk et al. ....... 423/210
2012/0090305 A1 4/2012 Floyd et al.
2012/0151902 A1* 6/2012 Yi et al. ......................... 60/301
2012/0174561 A1 7/2012 Troxler et al.
2013/0061577 A1* 3/2013 Floyd et al. .................... 60/295

* cited by examiner

SYSTEM AND APPARATUS FOR REDUCING REDUCTANT DEPOSIT FORMATION IN EXHAUST AFTERTREATMENT SYSTEMS

BACKGROUND

The present application generally relates to internal combustion systems, and more particularly, to exhaust aftertreatment systems for diesel engines.

Modern systems that include internal combustion engines often include a selective catalytic reduction (SCR) exhaust aftertreatment system to control exhaust system emissions. SCR systems typically include a reductant storage tank connected to a pump and a doser that injects reductant into the exhaust stream that, in conjunction with an SCR catalyst, operates to reduce NOx emissions. Even under normal operating conditions, reductant injected into the exhaust stream causes reductant buildup over time and, more specifically, reductant deposit formation near where the reductant is injected into the exhaust stream. Therefore, a need remains for further improvements in exhaust aftertreatment systems to reduce the formation of reductant deposits.

SUMMARY

One embodiment is a unique system and device to reduce reductant deposit formation in the exhaust system that directs at least a portion of an exhaust flow toward a reductant opening in an exhaust aftertreatment system. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
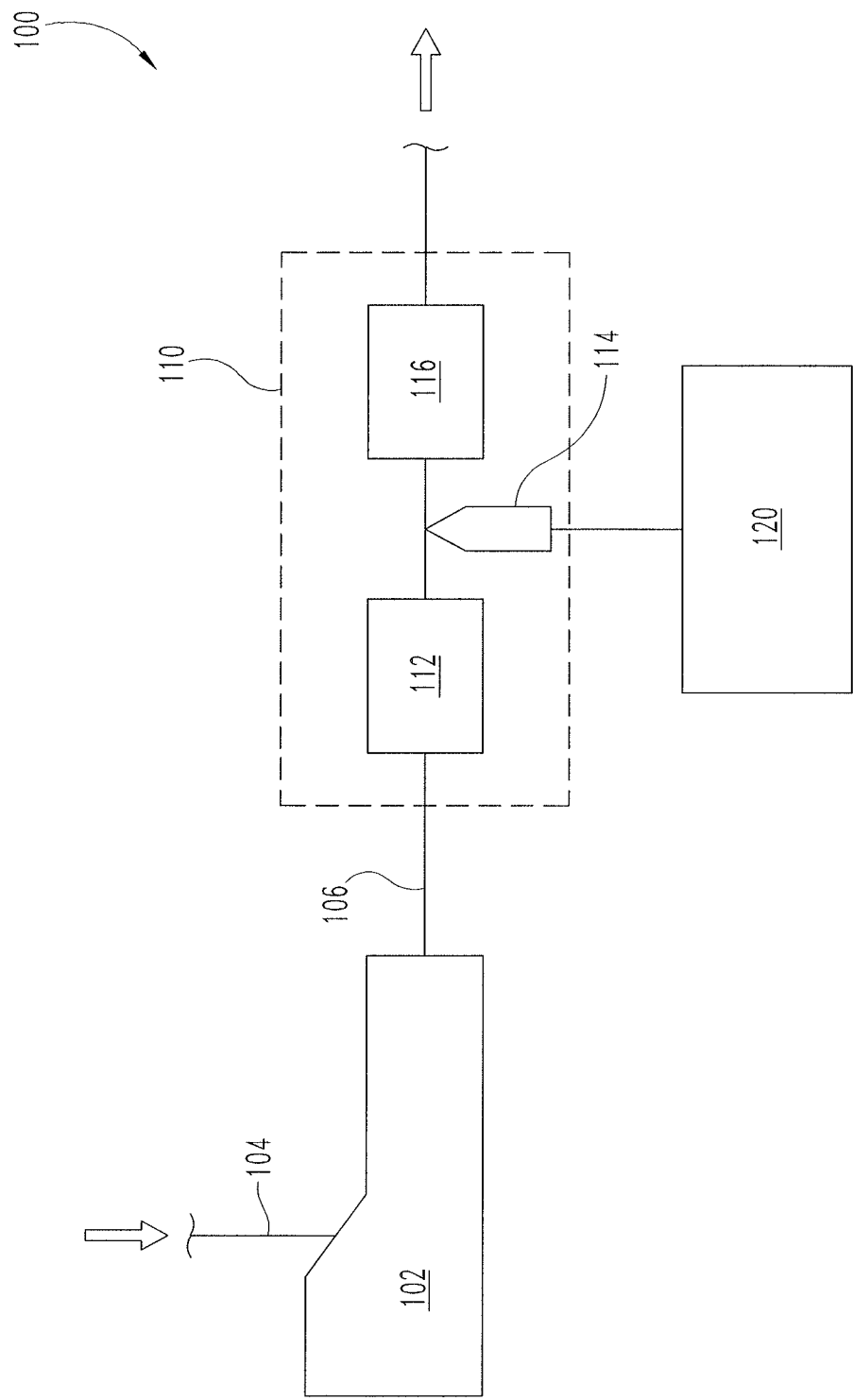
FIG. 1 is a schematic illustration of a system including an exemplary engine and exhaust aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated an exemplary system 100 that includes an exhaust aftertreatment system 110. System 100 may be provided on any suitable application, such as a vehicle powered by an engine 102 such as a diesel engine, or on an engine 102 utilized in other applications such as power generation, pumping, marine, and locomotive systems. Engine 102 includes an intake system 104 through which charge air enters and an exhaust system 106 through which a flow of exhaust gas resulting from combustion exits, it being understood that not all details of these systems that are typically present are shown.

Engine 102 includes a number of cylinders forming combustion chambers in which fuel combusts with the charge air that has entered through intake system 104. The combustion process produces a significant amount of emissions, most prominent being nitric oxide (NO) and nitrogen dioxide ($NO_2$), commonly known as $NO_x$. Other emissions include particulates, carbon monoxide (CO), and hydrocarbons (HC). Before entering the atmosphere, however, the exhaust gas is treated by one or more aftertreatment devices in the exhaust aftertreatment system 110 to reduce or eliminate such emissions.

In one example, the exhaust system 106 includes the exhaust aftertreatment system 110 having one or more selective catalytic reduction (SCR) catalysts 116, and one or more locations for receiving a reductant from a reductant dosing system 120. A reductant injector 114 is mounted on a portion of exhaust system 106 upstream of SCR catalyst 116 with its outlet, or nozzle, arranged to spray reductant into the exhaust system 106 where it mixes with engine exhaust gas produced by engine 102. SCR catalyst 116 promotes a chemical reaction between the reductant and NOx in the exhaust gas that converts substantial amounts of NOx to reduce NOx emissions before the exhaust gas passes into the atmosphere.

The exhaust aftertreatment system further includes an exhaust flow directing device 112 in the exhaust flow path upstream of the reductant injector 114. Exhaust flow directing device 112 directs at least a portion of the exhaust flow toward the reductant injector 114 to efficiently mix the exhaust gas and the reductant sprayed into the exhaust system 106 by the reductant injector 114. The efficient mixing of the exhaust gas and the reductant reduces reductant deposit formation in exhaust system 106. Reducing the reductant deposit formation increases the exhaust aftertreatment system's reliability and ability to meet emission requirements. The exhaust flow directing device 112 is further detailed below.

The aftertreatment system 110 may include one or more other aftertreatment components not shown, such as diesel oxidation catalysts, diesel particulate filters, an ammonia oxidation catalyst, and various temperature, pressure and exhaust gas constituent sensors. Exhaust system 106 may also include various components not shown, such an exhaust gas recirculation system, a turbocharger system, coolers, and other components connecting exhaust system 106 to intake system 104.

Reductant dosing system 120 receives reductant from a reductant storage tank (not shown) and provides the reductant to the exhaust system 106 via injector 114 or any suitable device or arrangement for injection or delivery of reductant to a decomposition chamber or directly to the exhaust system 106. As used herein, an injector includes any nozzle, static device, electronically controllable device, and/or mechanical actuator that provides an outlet for reductant delivery into the exhaust flow path. One example of a suitable reductant is a diesel exhaust fluid (DEF) which comprises a solution of 32.5% high purity urea and 67.5% deionized water. It shall be appreciated, however, that any suitable reductant for injection into an exhaust system with dosing system 120 may also be utilized.

Figure 2:
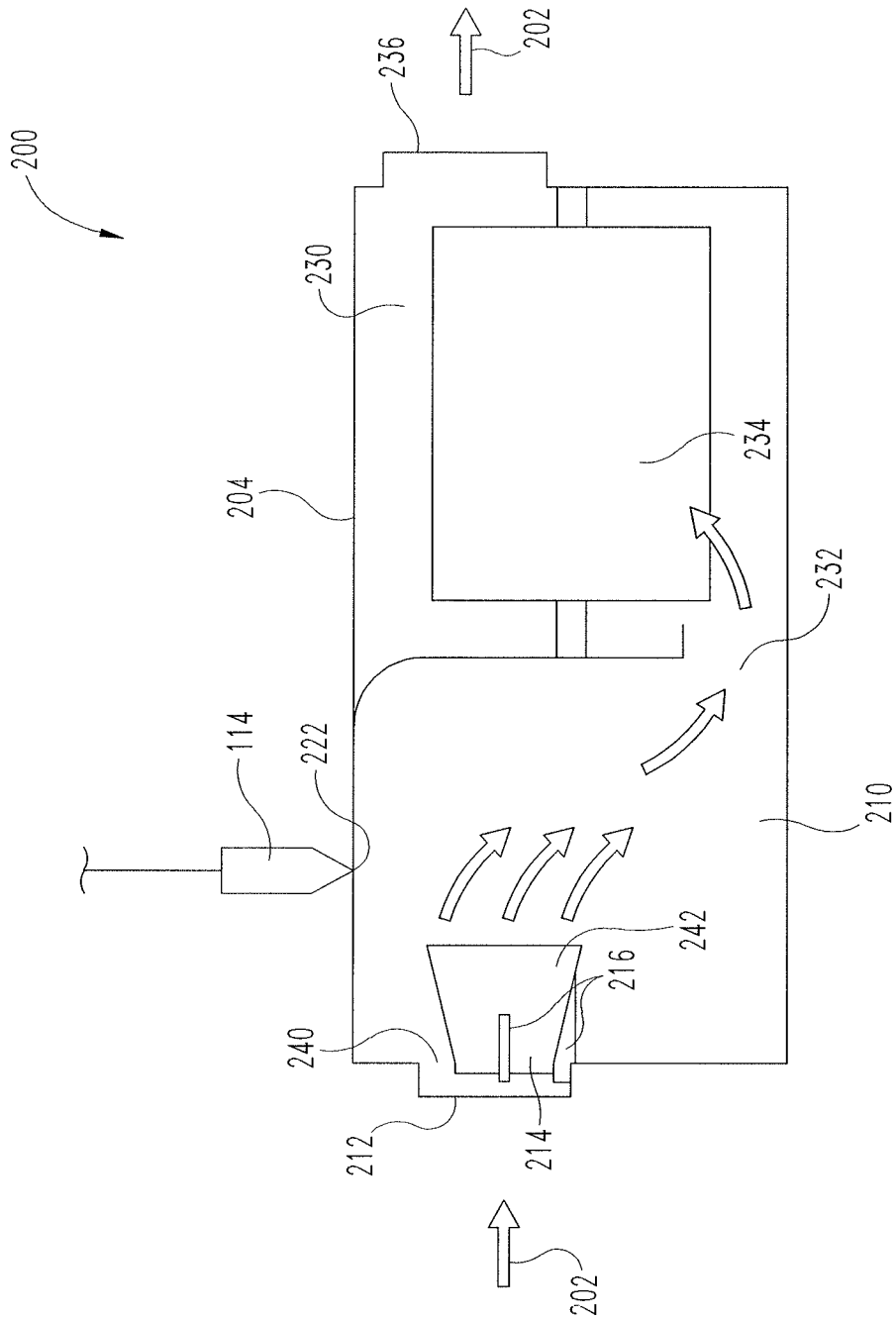
FIG. 2 is a schematic illustration of an exemplary exhaust aftertreatment apparatus.

FIG. 2 illustrates an exemplary embodiment of an exhaust aftertreatment apparatus 200. The aftertreatment apparatus 200 includes a housing 204 that defines a decomposition chamber 210 and a substrate chamber 230. In other embodiments, decomposition chamber 210 and substrate chamber 230 are defined by separate housings. The separate housings can be connected directly to one another or connected to one another by a conduit. The decomposition chamber 210 includes an inlet 212 for receiving an exhaust stream 202 produced from operation of the engine 102. An exhaust flow directing device 214 is located in or adjacent inlet 212 in the exhaust stream 202 flow path. Exhaust flow directing device 214 can be secured to inlet 212 by one or more braces 216. In other embodiments, exhaust flow directing device 214 is mounted to a wall of housing 204, an exhaust conduit connected to inlet 212, or other structure of the exhaust system. The decomposition chamber 210 is coupled to the reductant system 120 by at least one reductant injector opening 222 of the reductant injector 114 that is configured to inject a reductant into the exhaust stream 202 through the reductant injector opening 222.

The substrate chamber 230 is connected to decomposition chamber 210 through a substrate chamber inlet 232 for receiving the mixed reductant and exhaust stream 202 from decomposition chamber 210 into the substrate chamber. Inlet 232 is offset axially from the inlet 212 so that the exhaust stream 202 travels from a first side of decomposition chamber 210 where reductant opening 222 is located to an opposite side of decomposition chamber 210 for delivery of the mixed reductant and exhaust stream to substrate chamber 230. The offset arrangement provides a compact flow path that promotes mixing of the reductant and exhaust gas before delivery to substrate chamber 230. The substrate chamber 230 further includes one or more SCR catalysts 234 for promoting a chemical reaction between the reductant and NOx in the exhaust stream 202. The exhaust stream 202 exits housing 204 and the substrate chamber 230 through the substrate chamber outlet 236. Other arrangements of one or more SCR catalysts 234 in substrate chamber 230 are also contemplated. Outlet 236 is offset from inlet 232 and adjacent the same side of housing 204 as inlet 212, although other arrangements are not precluded.

The exhaust flow directing device 214 is mounted in the decomposition chamber inlet 212 to create a space between an outer surface of the exhaust flow directing device 214 and an inner surface of the decomposition chamber inlet 212. The space defines a first flow path 240 where at least a portion of the exhaust stream is directed through the space. A second flow path 242 is defined through the interior of the exhaust flow directing device 214. The second flow path 242 directs a second portion of the exhaust stream toward the reductant injector opening 222, creating a shear force across the reductant opening 222 which reduces the formation of reductant deposits. Additionally, the first and second flow paths 240, 242 separate the exhaust flow in a manner that reduces exhaust gas recirculation in the decomposition chamber 210, further reducing the formation of reductant deposits, without decreasing the flow of the exhaust stream 202 to the SCR catalysts 234.

The exhaust aftertreatment apparatus 200 illustrated in FIG. 2 shows the exhaust stream 202 entering a decomposition chamber inlet 212 that is located on the end of the decomposition chamber 210. It should be appreciated that the exhaust flow directing device 214 can be configured to accommodate alternative means of exhaust stream 202 entry into the decomposition chamber 210, depending on where the decomposition chamber inlet 212 is positioned relative to the housing 204 and the outlet 236. For example, inlet 212 can be located on the side of housing 204. As used herein, an end inlet and end outlet, such as shown in FIG. 2, are oriented in the same direction relative to the exhaust flow through housing 204, while a side inlet and end outlet are located in transverse orientations relative to one another on housing 204. However, any combination of inlets and outlets are contemplated, including end inlet and side outlet, side inlet and side outlet, etc. The exhaust flow directing device 314 in FIGS. 4A-4B, discussed in further detail below, is an example embodiment used in a side inlet, end outlet type exhaust flow directing device, although exhaust flow directing device 214 could be used in a side inlet arrangement and exhaust flow directing device 314 of FIGS. 4A-4B could be used in an end inlet arrangement.

Figure 3B:
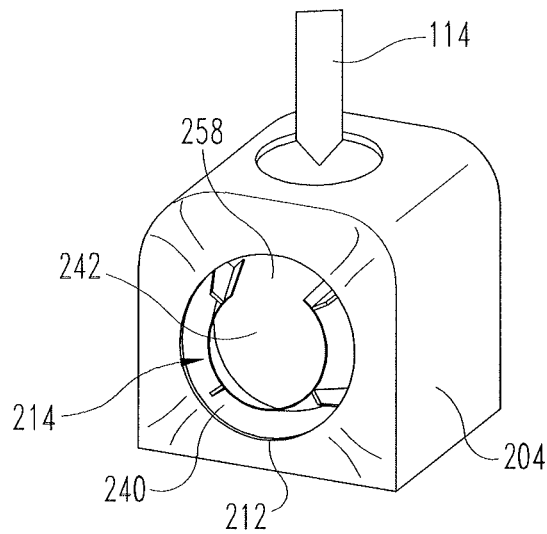
FIGS. 3A-3B are perspective views of one embodiment of an exhaust flow directing device and of the directing device mounted in an inlet of the exhaust aftertreatment apparatus, respectively.
Figure 3A:
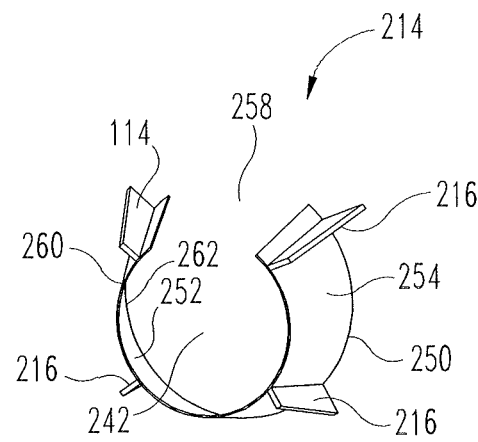

FIGS. 3A-3B illustrate further details of exhaust flow directing device 214. Exhaust flow directing device 214 includes a body 250 that has a conical frustum shape extending between a first end 260 and an opposite second end 262. Second end 262 is located toward decomposition chamber 230 and first end 260 is located away from second end 262 to receive the exhaust flow. Body 250 includes an inner surface 252 defining the second flow path 242 and an opposite outer surface 254 that, with the inner surface of inlet 212, defines first flow path 240. Body 250 further defines an opening or slot 258 along one side thereof that is oriented toward reductant opening 222 to direct at least a portion of exhaust flow toward reductant opening 222. Slot 258 provides an opening through which first flow path 240 and second flow path 242 communicate with one another. Braces 216 are connected to outer surface 254 and project radially outwardly therefrom for mounting with, for example, inlet 212 to space outer wall surface 254 from the inner surface of inlet 212 and form and maintain the opening of first flow channel 240.

Figure 4B:
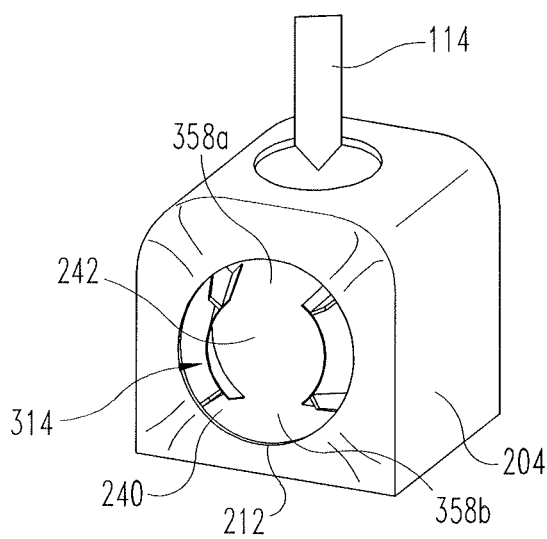
FIGS. 4A-4B are perspective views of another embodiment of an exhaust flow directing device and of the directing device mounted in an inlet of the exhaust aftertreatment apparatus, respectively
Figure 4A:
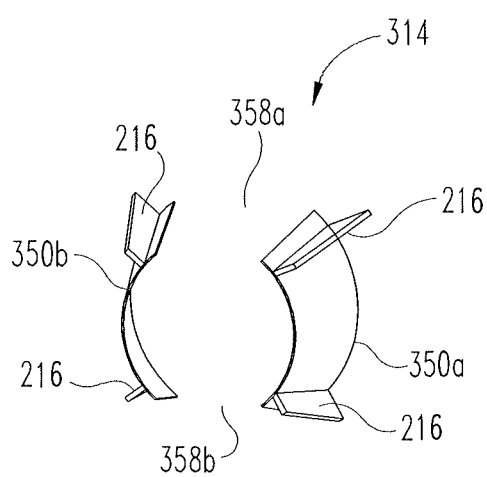

Referring to FIGS. 4A-4B, another embodiment exhaust flow directing device 314 is shown that is similar to exhaust flow targeting device 214. Exhaust flow targeting device includes first and second wall segments 350a, 350b with facing ends that form opposite slots 358a, 358b. Braces 216 are secured to respective ones of the wall segments 350a, 350b for mounting of exhaust flow directing device 314 in inlet 212 in a manner similar to that discussed above with respect to exhaust flow directing device 214, such as shown in FIG. 4B. Opposite slots 358a, 358b provide fluid communication between first flow path 240 and second flow path 242 at opposite sides of exhaust flow directing device 314.

Various aspects of the system and apparatus are disclosed herein. For example, one aspect involves a system that includes an internal combustion engine operable to produce an exhaust stream and an aftertreatment exhaust component assembly connected to the engine to receive the exhaust, the aftertreatment exhaust component assembly includes a decomposition chamber connected to a reduction assembly, the reduction assembly includes a catalyst downstream of the decomposition chamber, the decomposition chamber includes an inlet upstream of the connection with the reductant assembly and further includes an exhaust flow targeting device at the inlet, and the exhaust flow targeting device is configured to define a first exhaust flow path through the exhaust flow targeting device at the reductant system connection, and further configured to define a second exhaust flow path between an outer wall of the exhaust flow targeting device and the inlet.

In a further embodiment, the exhaust flow directing device is configured to direct exhaust flow toward the connection with reductant source. In still a further embodiment, the exhaust flow directing device includes a frusto-conically shaped body that expands outwardly in a direction of the exhaust flow. In yet a further embodiment, the body includes at least one slot forming a side opening of the body oriented toward the reductant opening. In yet still a further embodiment, the body includes a second slot forming a second side opening opposite the side opening. In another further embodiment, the body is formed by first and second wall segments that extend between the side openings.

In one embodiment of the system, the reductant system comprises a reductant storage tank, a reductant injector connected to the storage tank via a pump, and a doser tip connected to the reductant injector configured to be in the exhaust stream downstream of the exhaust flow targeting device.

Another example includes an exhaust emission aftertreatment apparatus that includes at least one housing defining a decomposition chamber fluidly coupled with a substrate chamber, wherein the substrate chamber houses a catalyst and the decomposition chamber is positioned upstream of the substrate chamber, the housing including an inlet into the decomposition chamber and a reductant opening downstream of the inlet for providing a flow of reductant into the decomposition chamber; and an exhaust flow directing device positioned at least partially in the inlet, wherein the exhaust flow directing device is configured relative to the inlet to direct a first portion of the exhaust flow along a first flow path that extends through the exhaust flow directing device into the decomposition chamber and a second portion of the exhaust flow along a second flow path that extends around the exhaust flow directing device into the decomposition chamber.

In one refinement of the apparatus, the exhaust flow directing device is connected to and spaced inwardly from an inner surface of the inlet by a plurality of braces to define the second flow path. In a further refinement, the exhaust flow directing device defines an outwardly tapered configuration for the first flow path in a direction of exhaust flow into the decomposition chamber. In another refinement, the exhaust flow directing device defines a first slot oriented toward the reductant opening and the slot extends between the first flow path and the second flow path. In yet another refinement, the exhaust flow directing device defines a second slot opposite the first slot, wherein each of the first and second slots extends between the first and second flow paths. In still yet a further refinement, the exhaust flow directing device defines a conical frustum shape that is oriented to expand in a direction of the exhaust flow into the decomposition chamber.

In yet a further refinement, the exhaust flow directing device includes an inner end oriented toward the decomposition chamber and an oppositely facing outer end, and a slot that extends through a wall of the exhaust flow directing device from the inner end to the outer end, wherein the slot is oriented toward the opening for the reductant. The exhaust flow directing device includes a first wall segment and a second wall segment, wherein a first end of each of the first and second walls segments are separated by the slot and an opposite second end of the first and second wall segments are separated by a second slot. In still a further refinement, the exhaust flow directing device is configured to direct exhaust flow toward the reductant opening. In yet still further refinements, the decomposition chamber and the substrate chamber are defined by a common housing or by separate housings.

In another embodiment of the apparatus for receiving an exhaust flow, the apparatus includes at least one housing defining a decomposition chamber fluidly coupled with a substrate chamber, wherein the substrate chamber houses a catalyst and the decomposition chamber is positioned upstream of the substrate chamber, the housing including an inlet into the decomposition chamber and a reductant opening downstream of the inlet for providing a flow of reductant into the decomposition chamber; and an exhaust flow directing device positioned at least partially in the inlet, wherein the exhaust flow directing device includes a frusto-conically shaped body that expands in a direction of the exhaust flow and the body includes at least one slot forming a side opening of the body oriented toward the reductant opening.

In a refinement of the embodiment, the body includes a second slot forming a second side opening opposite the side opening. In a further refinement of the embodiment, the body is formed by first and second wall segments that extend between the side openings.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An aftertreatment apparatus for receiving an exhaust flow, the apparatus comprising:
    at least one housing defining a decomposition chamber fluidly coupled with a substrate chamber, wherein the substrate chamber houses a catalyst and the decomposition chamber is positioned upstream of the substrate chamber, the housing including an inlet into the decomposition chamber and a reductant opening downstream of the inlet for providing a flow of reductant into the decomposition chamber; and
    an exhaust flow directing device positioned at least partially in the inlet,
    wherein the exhaust flow directing device includes a frusto-conically shaped body that includes a first end and an opposite second end, the exhaust flow directing device expands in a direction of the exhaust flow and the body includes at least one slot forming a side opening of the body oriented toward the reductant opening, the slot extending from the first end to the second end, the slot oriented towards the reductant opening, wherein the body includes a second slot forming a second side opening opposite the side opening.

2. The aftertreatment apparatus of claim 1, wherein the body is formed by first and second wall segments that extend between the side openings.

3. An aftertreatment apparatus for receiving an exhaust flow, the apparatus comprising:
    at least one housing defining a decomposition chamber fluidly coupled with a substrate chamber, wherein the substrate chamber houses a catalyst and the decomposition chamber is positioned upstream of the substrate chamber, the housing including an inlet into the decomposition chamber and a reductant opening downstream of the inlet for providing a flow of reductant into the decomposition chamber; and an exhaust flow directing device positioned at least partially in the inlet, wherein the exhaust flow directing device is configured relative to the inlet to direct a first portion of the exhaust flow along a first flow path that extends through the exhaust flow directing device into the decomposition chamber and a second portion of the exhaust flow along a second flow path that extends around the exhaust flow directing device into the decomposition chamber, the exhaust flow directing device including an inner end oriented toward the decomposition chamber and an oppositely facing outer end, and a slot that extends through a wall of the exhaust flow directing device from the inner end to the outer end, wherein the slot is oriented toward the opening for the reductant, the exhaust flow directing device further including a first wall segment and a second wall segment, wherein a first end of each of the first and second wall segments are separated by the slot and an opposite second end of the first and second wall segments are separated by a second slot.

4. An aftertreatment apparatus for receiving an exhaust flow, the apparatus comprising:

at least one housing defining a decomposition chamber fluidly coupled with a substrate chamber, wherein the substrate chamber houses a catalyst and the decomposition chamber is positioned upstream of the substrate chamber, the housing including an inlet into the decomposition chamber and a reductant opening downstream of the inlet for providing a flow of reductant into the decomposition chamber; and an exhaust flow directing device positioned at least partially in the inlet, the exhaust flow directing device positioned upstream of the reductant opening, wherein the exhaust flow directing device is configured relative to the inlet to direct a first portion of the exhaust flow along a first flow path that extends through the exhaust flow directing device into the decomposition chamber and a second portion of the exhaust flow along a second flow path that extends around the exhaust flow directing device into the decomposition chamber, the second flow path directing the second portion of the exhaust flow towards the reductant opening, the second portion of the exhaust flow creating a shear force across the reductant opening so as to reduce formation of reductant deposits;

wherein the exhaust flow directing device includes an inner end oriented toward the decomposition chamber and an oppositely facing outer end, and a slot that extends through a wall of the exhaust flow directing device from the inner end to the outer end, wherein the slot is oriented toward the opening for the reductant, the exhaust flow directing device including a first wall segment and a second wall segment, a first end of each of the first and second wall segments separated by the slot, and an opposite second end of the first and second wall segments separated by a second slot.

5. The aftertreatment apparatus of claim 4, wherein the exhaust flow directing device is connected to and spaced inwardly from an inner surface of the inlet by a plurality of braces to define the second flow path.

6. The aftertreatment apparatus of claim 4, wherein the exhaust flow directing device defines an outwardly tapered configuration for the first flow path in a direction of exhaust flow into the decomposition chamber.

7. The aftertreatment apparatus of claim 4, wherein the exhaust flow directing device defines a conical frustum shape that is oriented to expand in a direction of the exhaust flow into the decomposition chamber.

8. The aftertreatment apparatus of claim 4, wherein the exhaust flow directing device is configured to direct exhaust flow toward the reductant opening.

9. The aftertreatment apparatus of claim 4, wherein the decomposition chamber and the substrate chamber are defined by a common housing.

10. The aftertreatment apparatus of claim 4, wherein the slot extends between the first flow path and the second flow path.

11. The aftertreatment apparatus of claim 10, wherein each of the slot and the second slot extend between the first and second flow paths.

12. A system, comprising:

an internal combustion engine operable to produce an exhaust stream;

a reductant system including a reductant source;

an aftertreatment assembly connected to the engine to receive the exhaust stream from the engine, wherein the aftertreatment assembly includes:

a decomposition chamber connected to the reductant source to receive reductant therefrom via a reductant opening, the decomposition chamber including an inlet upstream of the connection with the reductant source;

a catalyst downstream of the decomposition chamber; and an exhaust flow directing device at the inlet and positioned upstream of the reductant opening, the exhaust flow directing device being configured to define a first exhaust flow path through the exhaust flow directing device and a second exhaust flow path between an outer wall of the exhaust flow directing device and the inlet, the second flow path directing a portion of exhaust flow towards the reductant opening, the portion of the exhaust flow creating a shear force across the reductant opening so as to reduce formation of reductant deposits, the exhaust flow directing device defining:

a first slot extending from a first end to a second end of the exhaust flow directing device and forming a first side opening, the first slot oriented towards the reductant opening, and a second slot forming a second side opening opposite the first slot.

13. The system of claim 12, wherein the reductant system comprises a reductant storage tank for storing the reductant source and a reductant injector connected to the storage tank, the reductant injector configured to inject reductant into the decomposition chamber downstream of the exhaust flow directing device.

14. The system of claim 12, wherein the exhaust flow directing device is configured to direct exhaust flow toward the connection with reductant source.

15. The system of claim 12, wherein the exhaust flow directing device includes a frusto-conically shaped body that expands in a direction of the exhaust flow.

16. The system of claim 15, wherein the body is formed by first and second wall segments that extend between the side openings.

* * * * *